(12) United States Patent
Kato et al.

(10) Patent No.: US 8,519,027 B2
(45) Date of Patent: Aug. 27, 2013

(54) AQUEOUS AMINO RESIN DISPERSIONS AND THERMOSETTING WATER-BASED PAINT COMPOSITIONS

(75) Inventors: Atsuya Kato, Hiratsuka (JP); Yoshiyuki Yukawa, Hiratsuka (JP); Hiroki Nagao, Aichi-ken (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 1526 days.

(21) Appl. No.: 11/294,355

(22) Filed: Dec. 6, 2005

(65) Prior Publication Data

US 2006/0135678 A1 Jun. 22, 2006

(30) Foreign Application Priority Data

Dec. 16, 2004 (JP) .................................. 2004-364587

(51) Int. Cl.
*C08G 59/04* (2006.01)
*C08L 67/02* (2006.01)
*C08L 67/00* (2006.01)
*B05D 1/36* (2006.01)

(52) U.S. Cl.
USPC ........... 523/500; 523/400; 524/539; 524/601; 524/602; 524/845; 427/407.1

(58) Field of Classification Search
USPC ................ 523/500, 400; 524/501, 539, 601, 524/602, 845; 427/402, 407.1
See application file for complete search history.

(56) References Cited

U.S. PATENT DOCUMENTS

| | | | |
|---|---|---|---|
| 4,076,766 A | | 2/1978 | Simms |
| 4,122,055 A | * | 10/1978 | Tugukuni et al. ............. 523/409 |
| 4,716,200 A | | 12/1987 | Berghoff |
| 5,015,688 A | | 5/1991 | Bederke et al. |
| 5,322,865 A | * | 6/1994 | Inoue et al. .................... 523/501 |
| 5,747,558 A | * | 5/1998 | Nishi et al. ..................... 523/201 |
| 5,760,137 A | | 6/1998 | Miyazoe et al. .............. 525/101 |
| 5,919,856 A | * | 7/1999 | Nishi et al. ..................... 524/539 |
| 6,174,965 B1 | * | 1/2001 | Yamashita et al. ............ 525/437 |
| 6,297,314 B1 | | 10/2001 | Hintze-Brüning et al. |
| 6,306,956 B1 | * | 10/2001 | Spilman et al. ............... 524/601 |
| 6,656,530 B2 | * | 12/2003 | Thieben et al. ............ 427/385.5 |
| 2003/0212192 A1 | | 11/2003 | Yuan et al. |
| 2010/0093914 A1 | * | 4/2010 | Yukawa et al. ............... 524/502 |

FOREIGN PATENT DOCUMENTS

| | | |
|---|---|---|
| EP | 0 394 589 A2 | 10/1990 |
| EP | 0 435 402 A3 | 7/1991 |
| EP | 0 579 193 A1 | 1/1994 |
| GB | 2 125 421 A | 3/1984 |
| JP | 11-124542 | 5/1999 |

* cited by examiner

*Primary Examiner* — Michael Pepitone
(74) *Attorney, Agent, or Firm* — Wenderoth, Lind & Ponack, L.L.P.

(57) ABSTRACT

An aqueous amino resin dispersion excelling in storage stability and mechanical stability which is formed by dispersing hydrophobic amino resin in aqueous medium, using a polyester resin having specific hydroxyl value, acid value and number-average molecular weight as a dispersion stabilizer, said polyester resin being prepared by reacting polyhydric alcohol, polycarboxylic acid and/or polycarboxylic anhydride and monoepoxide compound having a long chain hydrocarbon group; thermosetting, water-based paint compositions comprising the aqueous amino resin dispersion; and multi-layered coating film-forming methods using the water-based paint compositions are provided.

20 Claims, No Drawings

AQUEOUS AMINO RESIN DISPERSIONS AND THERMOSETTING WATER-BASED PAINT COMPOSITIONS

TECHNICAL FIELD

This invention relates to aqueous amino resin dispersions excelling in storage stability and mechanical stability, which are formed by dispersing hydrophobic amino resin in aqueous medium using polyester resin of specific composition and are useful as crosslinking agent of water-based paint; water-based paint compositions capable of forming coating films excelling in finished appearance and film performance, which contain the aqueous amino resin dispersions; and also to coating film-forming methods which use the water-based paint compositions.

BACKGROUND ART

Aqueous dispersions formed by dispersing hydrophobic amino resin in aqueous medium in the presence of water-soluble resin as a dispersion stabilizer, have been generally used in the field of paints. As water-soluble resins for preparing these aqueous dispersions, conventionally acrylic resin, alkyd resin, epoxy resin and the like which contain hydrophilic groups such as carboxyl, amino and the like groups are used.

Those aqueous dispersions are subject to such problems as insufficient storage stability under room temperature or elevated temperatures or notable viscosity change under mechanical load which, when the dispersions are used for making water-based paint, deteriorate the coating film performance, e.g., water resistance, and/or aggravate finished appearance of the coating film, due to poor dispersion of the amino resin.

Water-based paint compositions in which polyester resins of specific composition containing aromatic polybasic acid, ethylene glycol and the like as the essential monomeric components are used as a dispersion stabilizer for hydrophobic amino resin have also been proposed (e.g., see JP Hei 11(1999)-124542A). Such water-based paint compositions, however, are subject to a problem that a large quantity of the polyester resin is required for dispersing the amino resin in water, which invites a drawback that the paint compositions come to have high viscosity.

DISCLOSURE OF THE INVENTION

The object of the present invention is to provide aqueous amino resin dispersions which are free from those defects in conventional aqueous dispersions of hydrophobic amino resin and exhibit excellent storage stability and mechanical stability; thermosetting, water-based paint compositions which contain the aqueous amino resin dispersions and are capable of forming coating films excelling in finished appearance and performance; and coating film-forming methods which use the water-based paint compositions.

We have now discovered that a certain kind of polyester resin composed of monomeric components of specific composition containing, as a part of the constituents, monoepoxide compound having a long chain hydrocarbon group, is highly useful as a dispersion stabilizer of hydrophobic amino resin, and come to complete the present invention.

Thus the invention provides an aqueous amino resin dispersion characterized by comprising a polyester resin (a) having a hydroxyl value within a range of 10-200 mgKOH/g, an acid value within a range of 10-150 mgKOH/g and a number-average molecular weight of 1,000-10,000 and being prepared through reaction of polyhydric alcohol (a-1), polycarboxylic acid and/or polycarboxylic anhydride (a-2), and monoepoxide compound having a long chain hydrocarbon group (a-3), and hydrophobic amino resin (b), the weight ratio between the solid components of the polyester resin (a)/amino resin (b) being within a range of 5/95-49/51.

The present invention furthermore provides a thermosetting, water-based paint composition which contains the above aqueous amino resin dispersion.

The invention also provides a method of forming multi-layered coating film, using the thermosetting, water-based paint composition.

The aqueous amino resin dispersion according to the present invention excels in storage stability, mechanical stability and dispersion stability, and when it is used for thermosetting, water-based paint compositions as a crosslinking agent, in combination with film-forming resin, water-dispersible polymer particles and the like, it achieves remarkable effect of providing water-based paint compositions which are capable of forming coating films having excellent performance such as finished appearance, water resistance and the like.

Hereinafter the aqueous amino resin dispersions; thermosetting, water-based paint compositions; and the multi-layered coating film-forming method of the present invention are explained in further details.

Aqueous Amino Resin Dispersion:

The aqueous amino resin dispersion according to the present invention is a composition formed by dispersing hydrophobic amino resin (b) in an aqueous medium, in the presence of polyester resin (a) which is prepared from monomeric components of specific composition.

Polyester Resin (a)

The polyester resin (a) is obtained by reacting polyhydric alcohol (a-1), polycarboxylic acid and/or polycarboxylic anhydride (a-2) and monoepoxide compound having long chain hydrocarbon group (a-3).

Polyhydric alcohol (a-1) is a compound having at least 2, preferably 2-3, hydroxyl groups per molecule. As the polyhydric alcohol (a-1), for example, glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyl-trimethylene glycol, tetramethylene glycol, 3-methyl-4,5-pentanediol, 2,2,4-trimethyl-1,3-pentanediol, 1,6,-hexanediol, 1,5-hexanediol, 1,4-hexanediol, 2,5-hexanediol, 2-butyl-2-ethyl-1,3-propanediol, neopentyl glycol, hydroxypivalic acid neopentyl glycol ester and the like; polylactonediols formed by addition of lactones such as ε-caprolactone to these glycols; polyesterdiols such as bis(hydroxyethyl)terephthalate; 1,3-cyclohexanedimethanol, 1,4-cyclohexanedimethanol, tricyclodecanedimethanol, hydrogenated bisphenol A, hydrogenated bisphenol F, spiroglycol, dihydroxylmethyltricyclodecane, glycerine, trimethylolpropane, trimethylolethane, diglycerine, triglycerine, 1,2,6-hexanetriol, pentaerythritol, dipentaerythritol, tripentaerythritol, sorbitol, mannitol and the like can be named.

As the polyhydric alcohol (a-1), those compounds which have, besides at least two hydroxyl groups per molecule, an anionic group-forming functional group such as carboxyl group, sulfonic acid group and the like, may be used. As such compounds, for example, carboxyl-containing compounds such as dimethylolpropionic acid, dimethylolacetic acid, dimethylolbutanoic acid, dimethylolheptanoic acid, dimethylolnonanoic acid, dihydroxybenzoic acid, and half-ester compounds of polyoxypropylenetriol with maleic anhydride, phthalic anhydride or the like; and sulfonic acid group-containing compounds such as sodium salt of 2-sulfo-1,4-butanediol, sodium salt of 5-sulfo-di-β-hydroxyethylisophthalate and the like can be named.

Those polyhydric alcohols (a-1) can be used each singly or in combination of two or more.

As the (a-1) component, use of dihydric or trihydric alcohol is preferred, in particular, use of dimethylolpropionic acid or dimethylolbutanoic acid as at least a part of the (a-1) component is preferred.

The polycarboxylic acid (a-2) is a compound containing at least 2, preferably 2-3 carboxyl groups per molecule. As the polycarboxylic acid (a-2), for example, phthalic acid, isophthalic acid, terephthalic acid, succinic acid, adipic acid, azelaic acid, sebacic acid, naphthalenedicarboxylic acid, 4,4-diphenyldicarboxylic acid, diphenylmethane-4,4'-dicarboxylic acid, HET acid, maleic acid, fumaric acid, itaconic acid, trimellitic acid, pyromellitic acid, cyclohexane-1,3-dicarboxylic acid, cyclohexane-1,4-dicarboxylic acid, hexahydrophthalic acid, hexahydroisophthalic acid, hexahydroterephthalic acid, tetrahydrophthalic acid, hexahydrotrimellitic acid, methylhexahydrophthalic acid and the like can be named, which may be used either singly or in combination of two or more.

Polycarboxylic anhydride (a-2) is a compound having at least 1, preferably 1 or 2, acid anhydride groups per molecule, and as specific examples, anhydrides of above-named polycarboxylic acids can be named. Because one acid anhydride group acts as two carboxyl groups in esterification reaction, in this specification one acid anhydride group is taken as being divalent.

As the (a-2) component, use of divalent or trivalent carboxylic anhydride is particularly preferred.

Monoepoxide compound having a long chain hydrocarbon group (a-3) is a compound having one epoxy group and one chain or cyclic hydrocarbon group having at least 4, preferably 6-20, carbon atoms, per molecule. As specific examples of the monoepoxide compound (a-3), glycidyl esters such as glycidyl pivalate, glycidyl hexanoate, glycidyl cyclohexanecarboxylate, glycidyl 2-ethylhexanoate, glycidyl isononanoate, glycidyl decanoate, glycidyl undecanoate, glycidyl laurate, glycidyl myristate, glycidyl palmitate, glycidyl stearate, Cardura™ E10 (Japan Epoxy Resin Co. Ltd., monoglycidyl neodecanoate), Glydexx™ N-10 (Exxon Mobil Corporation, monoglycidyl decanoate) and the like; glycidyl ethers such as butyl glycidyl ether, phenyl glycidyl ether, decyl glycidyl ether and the like; and a-olefin monoepoxide such as styrene oxide, AOEX24™ (Daicel Chemical Industries Ltd., α-olefin monoepoxide mixture) and the like can be named.

The hydrocarbon groups having at least 4 carbon atoms may have substituent group(s) such as hydroxyl, and specific examples of monoepoxide compound having such substituted long-chain hydrocarbon group include 1,2-epoxyoctanol and hydroxyoctyl glycidyl ether.

These monoepoxide compounds (a-3) can be used either singly or in combination of two or more.

From the viewpoint of wetting property and compatibility, use of monoepoxide compound(s) having $C_6$-$C_{12}$ chain or cyclic hydrocarbon group(s) as the (a-3) component is preferred. In particular, those glycidyl esters, inter alia, Cardura™ E10, are preferred.

The polyester resin (a) can be prepared by subjecting above-described (a-1), (a-2) and (a-3) components to esterification reaction by a method known per se. More specifically, it can be prepared, for example, by heating the (a-1), (a-2) and (a-3) components in nitrogen current at temperatures of from about 90 to about 250° C. for about 5-10 hours, to effect an esterification reaction between epoxy groups and carboxyl groups and that between hydroxyl groups and carboxyl groups. In that occasion, the (a-1), (a-2) and (a-3) components may be concurrently mixed and reacted, or the reaction can be effected in multistages in which (a-1) and (a-2) components are reacted first and thereafter (a-3) component is added and reacted. In the esterification reactions, esterification catalyst known per se, such as dibutyltin oxide, antimony trioxide, zinic acetate, manganese acetate, cobalt acetate, calcium acetate, lead acetate, tetrabutyl titanate, tetraisopropyl titanate and the like may be used as the catalyst.

Thus obtained polyester resin (a) generally has a number-average molecular weight within a range of 1,000-10,000, preferably 1,500-7,500, inter alia, 2,000-5,000; hydroxyl value within a range of 10-200 mgKOH/g, preferably 20-150 mgKOH/g. inter alia, 30-100 mgKOH/g; and acid value within a range of 10-150 mgKOH/g, preferably 15-115 mgKOH/g, inter alia, 20-80 mgKOH/g. Where the polyester resin (a) has a number-average molecular weight greater than 10,000, it becomes difficult to give a high solid content to the intended final product of water-based paint composition, and when it has a hydroxyl value less than 10 mgKOH/g, the paint composition tends to give coating film whose hardenability is insufficient.

In the present specification, number-average molecular weights of polymers or resins are the values of those measured by gel permeation chromatograph ("HLC8120GPC", Tosoh Corporation) and converted based on the number-average molecular weight of polystyrene. The measurement was conducted with use of four columns of "TSKgel G-4000 H×L", "TSKgel G-3000 H×L", "TSKgel G-2500 H×L" and "TSKgel G-2000 H×L" (trademarks, Tosoh Corporation) under the conditions of mobile phase, tetrahydrofuran; measuring temperature, 40° C.; flow rate, 1 cc/min; and detector, R1.

The use ratios among the (a-1), (a-2) and (a-3) components are so selected as will make the hydroxyl value, acid value and number-average molecular weight of the formed polyester resin (a) fall within the above-specified ranges.

In respect of water dispersibility of the formed polyester resin (a), it is particularly recommendable to use the (a-1) component within a range of 10-90 parts by weight, preferably 15-80 parts by weight, inter alia, 20-70 parts by weight, per 100 parts by weight of the sum of the three components (a-1), (a-2) and (a-3).

The polyester resin (a) may be urethanated. Urethanation of the polyester resin can be conducted by any methods known per se, for example, by subjecting a polyisocyanate compound to urethanation reaction with a part of hydroxyl groups in a polyester resin which is formed as above.

As the polyisocyanate compound which can be reacted with hydroxyl-containing polyester resin, for example, aliphatic diisocyanates such as lysine diisocyanate, hexamethylene diisocyanate, trimethylhexane diisocyanate and the like; cycloaliphatic diisocyanates such as hydrogenated xylylene diisocyanate, isophorone diisocyanate, methylcyclohexane-2,4- or 2,6-diisocyanate, 4,4'methylenebis(cyclohexylisocyanate), 1,3-(isocyanatomethyl)cyclohexane and the like; aromatic diisocyanates such as tolylene diisocyanate, xylylene diisocyanate, diphenylmethane diisocyanate and the like; organic polyisocyanates per se such as at least trivalent polyisocyanate such as lysine triisocyanate, or adducts of such organic diisocyanates with polyhydric alcohol, low molecular weight polyester resin, water or the like; or cyclized polymers between such organic diisocyanates (e.g, isocyanurate), biuret-type adducts and the like can be named. These polyisocyanate compounds can be used each singly or as a mixture of at least two of them.

The reaction ratio of above hydroxyl-containing polyester resin with polyisocyanate compound is not critical, so long as the hydroxyl value, acid value and number-average molecular weight of the resulting urethanated polyester resin fall within the specified ranges.

Hydrophobic Amino Resin (b)

"Amino resin" said in this specification generally include condensation products of amino compounds such as melamine, benzoguanamine, acetoguanamine, urea and the like, with formaldehyde; and etherified products of those condensation products with alcohol.

Hydrophobic amino resin (b) which is useful for aqueous amino resin dispersion of the present invention can be the one whose titer of water (mL) as measured by the following method is not higher than 9 (mL), less titer indicating higher hydrophobicity.

Measuring Method of Titer of Water

In a 50 mL-beaker, 0.5 g of an amino resin is dissolved in 10 mL of acetone. The beaker is placed on a paper printed with No. 5 type letters, and into the solution deionized water is added dropwise by 0.01 mL per drop with an automatic micro-titration apparatus, at 20° C. under stirring with magnetic stirrer. With the quantitative increase in the dropped deionized water, solubility of the amino resin decreases and the acetone solution of the resin becomes opaque. The dropwise addition of deionized water is continued until the No. 5 type letters become illegible to naked eyes through the content of the beaker, and at that time point the dropped amount (mL) is read on the scale, which is recorded as the titer (mL) of water.

As hydrophobic amino resin (b) useful for aqueous amino resin dispersions according to the present invention, those having the titer (mL) of water as measured by the above-described method not higher than 9 (mL), preferably not higher than 7 (mL), inter alia, not higher than 5 (mL), can be conveniently used.

As such hydrophobic amino resins (b), particularly those prepared by using melamine as the amino compound, i.e., melamine resins, are preferred.

As the alcohol to be used for etherification (alkyl etherification) of condensate of the amino compound with formaldehyde, normally one of these monohydric alcohols such as methyl alcohol, ethyl alcohol, isopropyl alcohol, n-butyl alcohol, isobutyl alcohol, octyl alcohol, 2-ethylhexyl alcohol, benzyl alcohol and the like, or combination of two or more of these alcohols, can be named.

The amino resins before the etherification normally contain, as functional groups, (1) residual amino group (—$NH_2$), (2) iminomethylol group (—$NHCH_2OH$), (3) dimethylolamino group [—$N(CH_2OH)_2$] and the like. The hydrophobic amino resin (b) to be used in aqueous amino resin dispersions according to the invention has, as defined in the above, a titer of water not higher than 9 (mL). Whereas, amino resins in which at least about 35 mol % of methylol in all of the functional groups (1)-(3) has been etherified with one or more of at least $C_4$, preferably $C_4$-$C_7$, alcohols among those above-named monohydric alcohols, generally satisfy the above requirement for the titer of water.

As the hydrophobic amino resins (b), generally those having weight-average molecular weight falling within the range of 500-10,000, in particular, 1,000-6,000 can be conveniently used, from the viewpoint of coating film performance such as water resistance, finished appearance and the like, of the coating film of thermosetting, water-based paint composition in which the aqueous amino resin dispersion of the present invention is used.

Again from the viewpoint of coating film performance, butyl ether-containing amino resin which has been etherified with n-butyl alcohol is convenient as the hydrophobic amino resin (b). In particular, the amino resins in which all of alkyl ether groups are butyl ether groups are recommended.

As specific examples of hydrophobic amino resin (b), U-Van™ series products of Mitsui Chemicals, e.g., U-Van™ 20 SB, U-Van™ 20 SE and the like can be named.

Aqueous amino resin dispersions of the present invention can be prepared, for example, by dispersing a hydrophobic amino resin (b) in an aqueous medium under stirring and mixing, in the presence of a polyester resin (a) as a dispersion stabilizer. In that occasion, the polyester resin (a) may be neutralized with a neutralizer such as a basic compound, either before the mixing or in halfway the mixing. The polyester resin (a) can be neutralized with normally 0.3-1.2 equivalents, preferably 0.5-1.0 equivalent, of a basic compound, to the acid groups present therein. Examples of useful basic compound include inorganic basic compounds such as alkali metal hydroxides or ammonia; and amine compounds such as methylamine, dimethylamine, trimethylamine, ethylamine, diethylamine, triethylamine, isopropylamine, diisopropylamine, diethylenetriamine, triethylenetetramine, monoethanolamine, diethanolamine, 2-amino-2-methylpropanol, morpholine, N-methylmorpholine, N-ethylmorpholine, piperazine, dimethylethanolamine, diethylethanolamine, dimethyldodecylamine and the like. Of these, triethylamine, dimethylethanolamine and diethylethanolamine are particularly preferred.

The stirrer and/or disperser to be used in the occasion of stirring and mixing such hydrophobic amino resin (b) in an aqueous medium in the presence of the polyester resin (a) is subject to no critical limitation and, for example, any of disperser, homomixer, homogenizer, high pressure emulsifier, ultrasonic mixer, ball mill, sand mill or the like can be used.

As specific, preferred methods for making the aqueous amino resin dispersion, for example, the methods hereafter described can be used:

(1) a method which comprises stirring a mixture comprising the polyester resin (a) and hydrophobic amino resin (b) for about an hour, at temperatures ranging from about 40° to about 100° C., preferably from about 50° to about 90° C., then optionally adding a neutralizer, further conducting the dispersion in water at about 20°-about 60° C. under addition of deionized water, and removing the solvent where necessary; or (2) a method which comprises dispersing a pre-mixture comprising the polyester resin (a), hydrophobic amino resin (b) and water, with high-pressure emulsifier, and removing the solvent where necessary.

In particular, by the method (1), aqueous amino resin dispersion having sharp particle size distribution of the dispersed particles of more uniform particle size can be obtained. Furthermore, according to the method as described under (1), favorable aqueous amino resin dispersions can be obtained, without the need to use mixers of high agitation power, such as a high speed mixer. It is important that the particles dispersed in the resulting aqueous amino resin dispersion have a uniform size, for securing stability of the dispersion itself as well as favorable finished appearance and film performance of water-based paint composition in which the dispersion is used as a crosslinking agent.

More specifically, an aqueous amino resin dispersion of the present invention can be prepared, for example, in the following manner: first, a hydrophilic organic solvent solution of polyester resin (a) and hydrophobic amino resin (b) are uniformly mixed with a dispersing device, homomixer, ultrasonic mixer, ball mill, sand mill or the like. Where necessary, it is permissible to blend coloring pigment, metallic pigment, extender or the like in that occasion, or to add a minor amount of hydrophilic solvent such as alcoholic solvent, ether-derived solvent or the like. In certain occasions, an emulsifier of an amount not detrimental to the coating film performance such as water resistance of the thermosetting, water-based paint composition, may also be added for improving dispersibility. As the useful emulsifier, anionic emulsifier, nonionic emulsifier, amphoteirc ionic emulsifier and the like can be named.

Then a basic compound is added to the mixture where necessary, followed by further thorough mixing. Subsequent gradual addition of about 0.5-about 5 weight times the combined solid weight of the polyester resin (a) and hydrophobic amino resin (b) of deionized water under violent stirring can provide a milk-white or colored aqueous amino resin dispersed composition.

Where no pigment is contained, suitable average particle size of the dispersed particles in the aqueous amino resin dispersion is within a range of about 80-about 400 nm, preferably about 100-about 400 nm. The degree of agitation in the occasion of adding the deionized water can suitably adjusted depending on the type of stirrer and/or disperser, amount of feed, and the like. For example, where the stirring is conducted with a disperser at a rotation speed of 1,000-1,500 rpm, an aqueous amino resin dispersion containing dispersed particles having an average particle size within the above-specified range can be obtained in about 15-60 minutes. In the occasion of stirring and dispersing, the mixture may be heated to about 40-about 100° C., where necessary. Furthermore, where necessary, the solvent may be removed according to conventional practice using a reduced pressure distillation apparatus, for reducing the solvent contained in the aqueous amino resin dispersion.

As pigment which can be blended in the aqueous amino resin dispersion, metallic pigment, coloring pigment and the like which have been conventionally used in the field of paint are useful. More specifically, examples of the metallic pigment include aluminum flakes, copper bronze flakes and the like, and examples of coloring pigment include inorganic pigment such as titanium dioxide, iron oxide, chromium oxide, lead chromate, carbon black and the like; and organic pigment such as Phthalocyanine Blue, Phthalocyanine Green, Carbazole Violet, Anthrapyrimidine Yellow, Flavanthrone Yellow, Isoindoline Yellow, Indanthrone Blue, Quinacridone Violet and the like.

Suitable blend ratio between the polyester resin (a) and hydrophobic amino resin (b) in the aqueous amino resin dispersion according to the present invention can be, in terms of solid content of (a) component/(b) component by weight, within a range of 5/95-49/51, preferably 10/90-40/60, inter alia, 15/85-35/65.

Where the weight ratio of the solid contents is less than 5/95, average particle size of the hydrophobic amino resin (b) in the aqueous dispersion tends to become large, and storage stability of the dispersion tends to decrease. On the contrary, where the weight ratio of the solid contents is more than 49/51, the ratio of the polyester resin (a) to the hydrophobic amino resin (b) becomes excessive. Hence, an attempt to blend a large amount of the hydrophobic amino resin (b) in the course of formulating a thermosetting paint composition inevitably results in blending of greater amount of the polyester resin (a). Thus the degree of freedom in blending paint components decreases with the increase in the blend ratio of the polyester resin (a) to the hydrophobic amino resin (b).

In the aqueous amino resin dispersion of the preset invention, presumably the hydrophobic moieties of the polyester resin (a) are adsorbed onto surfaces of the hydrophobic amino resin (b) particles and the hydrophilic moieties of the polyester resin (a) are coordinated in the aqueous phase side. That is, those hydrophobic amino resin (b) particles are inferred to be surrounded and protected by the polyester resin (a) in the aqueous dispersion and to be stably dispersed in the aqueous medium, as assisted by the hydrophilic moieties of the polyester resin (a).

Combined solid content of the polyester resin (a) and hydrophobic amino resin (b) in the aqueous amino resin dispersion of the present invention is not particularly limited, but is broadly variable depending on intended utility or the like of the dispersion. Whereas, generally convenient range is, based on the weight of the aqueous dispersion, 10-50% by weight, in particular, 15-35% by weight.

Thermosetting, Water-Based Paint Compositions:

An aqueous amino resin dispersion (A) according to the present invention excels in, as aforesaid, storage stability, mechanical stability and dispersion stability, and can provide thermosetting, water-based paint composition which is capable of forming coating excelling in film performance such as finished appearance, water resistance and the like, when used as a crosslinking agent, in combination with, e.g., crosslinking functional group-containing, film-forming resin (B), water-dispersible polymer particles (C) and the like.

Those crosslinking functional group-containing, film-forming resin (B) and water-dispersible polymer particles (C) which can be used for thermosetting, water-based paint composition of the present invention in combination with the aqueous amino resin dispersion (A) are subject to no critical limitation, but those which are conventionally used for thermosetting water-based paint can be used in similar manner. In the following, such film-forming resin (B) and water-dispersible polymer particles (C) which are conveniently used for thermosetting, water-based paint compositions of the present invention are further explained.

Film-Forming Resin (B)

Crosslinking functional group-containing, film-forming resin (B) which can be conveniently used for thermosetting water-based paint compositions of the present invention is subject to no critical limitation, but those which are usually used as main resins of water-based paint compositions can be used in the conventional manner. As examples of the crosslinking functional group, hydroxyl, carboxyl, epoxy and the like can be named, hydroxyl being particularly preferred.

As crosslinking functional group-containing, film-forming resin (B), generally those having acid values within a range of 5-200 mgKOH/g, preferably 7.5-150 mgKOH/g, inter alia, 10-100 mgKOH/g; hydroxyl values within a range of 5-200 mgKOH/g, preferably 7.5-150 mgKOH/g, inter alia, 10-100 mgKOH/g; and number-average molecular weight within a range of 500-100,000. preferably 750-75,000, inter alia, 1,000-50,000, can be conveniently used, in respect of dispersibility in aqueous medium and density of functional groups and molecular weight necessary for imparting favorable film-forming property. As specific kinds of the main resins, acrylic resin, polyester resin, urethanated polyester resin, epoxy resin and the like can be named. Of these, particularly acrylic resin and polyester resin as described in the following are conveniently used.

Acrylic Resin

As acrylic resin, those synthesized through (co)polymerization in accepted manner of radical-polymerizable acrylic monomer(s) can be used. As the polymerization method, solution polymerization is convenient. As the organic solvent useful for the solution polymerization, for example, hydrophilic organic solvents such as propylene glycol-type and dipropylene glycol type are preferred. Also from the standpoint of dispersibility in water, acrylic resins having acid groups such as carboxyl are preferred.

As radical-polymerizable acrylic monomers, those heretofore known, such as, for example, hydroxyl-containing radical-polymerizable monomers, carboxyl-containing radical-polymerizable monomers and other radical-polymerizable monomers can be used. Through their copolymerization at such ratios as will satisfy the above-specified ranges of acid value, hydroxyl value and number-average molecular weight, object acrylic resins can be obtained.

As examples of hydroxyl-containing radical-polymerizable monomer, 2-hydroxyethyl(meth)acrylate, hydroxylpropyl(meth)acrylate, 4-hydroxybutyl(meth)acrylate, tetrahydrofurfuryl(meth)acrylate, ε-caprolactone-modified tetrahydrofurfuryl(meth)acrylate, ε-caprolactone-modified hydroxyethyl(meth)acrylate, polyethylene glycol mono(meth)acrylate, polypropylene glycol mono(meth)acrylate, 2-hydroxy-3-phenoxypropyl(meth)acrylate, 2-hydroxy-3-butoxypropyl(meth)acrylate, phthalic acid monohydroxyethyl(meth)acrylate and the like can be named.

As examples of carboxyl-containing radical-polymerizable monomers, acrylic acid, methacrylic acid and the like can be named.

As examples of other radical-polymerizable monomer, styrene, methyl(meth)acrylate, ethyl(meth)acrylate, butyl(meth)acrylate, 2-ethylhexyl(meth)acrylate, lauryl(meth)acrylate, cyclohexyl(meth)acrylate, cyclohexenyl(meth)acrylate, phenoxyethyl(meth)acrylate, phenoxypolyethylene glycol(meth)acrylate, dicyclopentenyl(meth)acrylate, dicyclopentenyloxyethyl(meth)acrylate, isobornyl(meth)acrylate, benzyl(meth)acrylate, ARONIX™ M110 (Toa Gosei), N-methylol(meth)acrylamide, N-butoxy(meth)acrylamide, acryloyl morpholine, dimethylaminoethyl(meth)acrylate, N-vinyl-2-pyrrolidone, γ-acryloxypropyltrimethoxysilane and the like can be named.

In the above, "(meth)acrylate" means "acrylate or methacrylate".

Polyester Resin

As the polyester resin, those other than the polyester resin (a), which can be synthesized through esterification reaction of polybasic acid with polyhydric alcohol according to known practices can be used.

Polybasic acid is a compound having at least two carboxyl groups per molecule, examples of which include phthalic acid, isophthalic acid, terephthalic acid, succinic acid, adipic acid, azelaic acid, sebacic acid, tetrahydrophthalic acid, hexahydrophthalic acid, HET acid, maleic acid, fumaric acid, itaconic acid, trimellitic acid, and anhydrides of those acids. Polyhydric alcohol is a compound having at least two hydroxyl groups per molecule, examples of which include ethylene glycol, propylene glycol, butylene glycol, hexanediol, diethylene glycol, dipropylene glycol, neopentyl glycol, triethylene glycol, glycerine, trimethylolethane, trimethylolpropane, pentaerythritol and the like.

As the polyester resin, fatty acid-modified polyester resins which are modified with (semi)dry oil fatty acid such as linseed oil fatty acid, coconut oil fatty acid, safflower oil fatty acid, soybean oil fatty acid, sesame oil fatty acid, perilla oil fatty acid, hemp oil fatty acid, tall oil fatty acid, dehydrated castor oil fatty acid and the like can also be used. Generally preferred extent of modification with these fatty acids is not more than 30 wt % in terms of oil length. It is also permissible to use those which are partially reacted with monobasic acid such as benzoic acid. Furthermore, for the purpose of introducing acid groups into the polyester resin, those esterification products of aforesaid polybasic acid with polyhydric alcohol can be further reacted with such a polybasic acid or anhydride thereof as trimellitic acid, trimellitic anhydride or the like.

The intended polyester resin can be thus obtained by suitably selecting the reactants among polybasic acids and polyhydric alcohols as described in the above, and subjecting them to the reaction in combination at a ratio as will satisfy the specified ranges of acid value, hydroxyl value and number-average molecular weight.

Water-Dispersible Polymer Particles (C)

As water-dispersible polymer particles (C) which can be conveniently used in thermosetting, water-based paint compositions according to the present invention, those conventionally used as main resin, chipping resistant agent, thickening agent or the like in aqueous resin compositions such as water-based paint and the like can be used in similar manner. In particular, those water-dispersible acrylic polymer particles (C-1) or water-dispersible urethane polymer particles (C-2) as described in the following are preferred, which are particularly suitable for thermosetting, water-based paint compositions to be used as water-borne base coat paint.

Water-Dispersible Acrylic Polymer Particles (C-1)

As the water-dispersible acrylic polymer particles (C-1), for example, those obtained by emulsion polymerization of vinyl monomer using radical polymerization initiator, in the presence of a dispersion stabilizer such as surfactant, can be used.

Such water-dispersible acrylic polymer particles (C-1) may have homogeneous structure or multi-layered structure such as core/shell structure, and may be of either non-crosslinked type (particle) or crosslinked type (particle). With core/shell structure particles, either one or both of the core and shell portions can be crosslinked type (particle) or non-crosslinked type (particle), e.g., by selecting crosslinked type (particle) as the core and non-crosslinked type (particle), as the shell.

As vinyl monomers to be emulsion polymerized, those selected from carboxyl-containing vinyl monomers (M-1), hydroxyl-containing vinyl monomers (M-2) and other vinyl monomers (M-3) are convenient. It is furthermore possible to concurrently use a minor amount of polyvinyl compound having at least two polymerizable unsaturated bonds per molecule (M-4); or concurrently use a minor amount of vinyl monomer having a glycidyl group per molecule with carboxyl-containing vinyl monomer (M-1), or concurrently use a minor amount of vinyl monomer having an isocyanate group per molecule with hydroxyl-containing vinyl monomer (M-2), to provide intra-particle crosslinked water-dispersible acrylic polymer particles.

More specifically, core/shell structured water-dispersible acrylic polymer particles (C-1) can be obtained by, for example, first emulsion polymerizing a vinyl monomer component which contains no or nearly no carboxyl-containing vinyl monomer (M-1), thereafter adding thereto another vinyl monomer component containing a large amount of carboxyl-containing vinyl monomer (M-1) and further conducting emulsion polymerization.

Water-dispersible acrylic polymer particles (C-1) of crosslinked core-type core/shell structure can be obtained, more specifically, for example by first emulsion polymerizing a vinyl monomer component which contains a minor amount of polyvinyl compound (M-4) but no or nearly no carboxyl-containing vinyl monomer (M-1), then adding thereto another vinyl monomer component containing a large amount of carboxyl-containing vinyl monomer (M-1) and further conducting emulsion polymerization.

Binding of the core and shell portions can be effected, for example, by copolymerizing polymerizable unsaturated bond introduced via hydrolysable functional group or silanol group at the core surface, or polymerizable unsaturated bond derived from allyl(meth)acrylate remaining on the core surface, with a vinyl monomer component containing carboxyl-containing vinyl monomer (M-1) (whereby the shell portion is formed).

Carboxyl-containing vinyl monomer (M-1) include those compounds having at least one carboxyl group and one polymerizable unsaturated bond per molecule, such as, for example, acrylic acid, methacrylic acid, crotonic acid, maleic acid, itaconic acid and the like. Furthermore, acid anhydrides of these compounds or half-esterified monocarboxylic acids are encompassed by monomer (M-1) in this specification.

Hydroxyl-containing vinyl monomer (M-2) includes compounds having hydroxyl group(s) and polymerizable unsaturated bond(s) per molecule, the hydroxyl group acting as the functional group to react with crosslinking agent. As the monomer (M-2), monoesterified products of acrylic acid or methacrylic acid with $C_2$-$C_{10}$ dihydric alcohols are convenient, examples of which include 2-hydroxyethyl acrylate, 2-hydroxyethyl methacrylate, hydroxypropyl acrylate, hydroxypropyl methacrylate, hydroxybutyl acrylate, hydroxybutyl methacrylate and the like. Furthermore, N-methylol acrylamide, N-methylol methacrylamide and the like can be used.

Other vinyl monomer (M-3) includes those other than above monomers (M-1) and (M-2) and which contain one polymerizable unsaturated bond per molecule, specific examples being listed in the following (1) to (8):

(1) esterification products of acrylic acid or methacrylic acid with $C_1$-$C_{20}$ monohydric alcohols; for example, methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, cyclohexyl acrylate, cyclohexyl methacrylate, lauryl acrylate, lauryl methacrylate and the like (2) aromatic vinyl monomers; for example, styrene, α-methylstyrene, vinyltoluene and the like (3) glycidyl-containing vinyl monomers; compounds containing one each of glycidyl group and polymerizable unsaturated bond per molecule, specific examples including glycidyl acrylate, glycidyl methacrylate and the like (4) nitrogen-containing alkyl ($C_1$-$C_{20}$) acrylate; for example, dimethylaminoethyl acrylate, dimethylaminoethyl methacrylate and the like (5) polymerizable unsaturated bond-containing amide compounds; for example, acrylic amide, methacrylic amide, dimethylacrylamide, N,N-dimethylpropylacrylamide, N-butoxymethylacrylamide, diacetoneacrylamide and the like (6) vinyl compounds; for example, vinyl acetate, vinyl propionate, vinyl chloride and the like (7) polymerizable unsaturated bond-containing nitrile compounds; for example, acrylonitrile, methacrylonitrile and the like (8) diene compounds; for example, butadiene, isoprene and the like.

These other vinyl monomers (M-3) can be used either singly or in combination of two or more.

Examples of the polyvinyl compound (M-4) include ethylene glycol diacrylate, ethylene glycol dimethacrylate, triethylene glycol diacrylate, tetraethylene glycol dimethacrylate, 1,6-hexanediol diacrylate, allyl methacrylate, allyl acrylate, divinylbenzene, trimethylolpropane triacrylate, methylenebisacrylamide and the like. Aforesaid diene compounds are not included in (M-4).

As dispersion stabilizer to be used in the emulsion polymerization, anionic emulsifier, nonionic emulsifier, amphoteric ionic emulsifier, and the like can be named. More specifically, as anionic emulsifier, for example, fatty acid, alkyl sulfate, alkyl benzenesulfonate, alkyl phosphate and the like can be named; as nonionic emulsifier, for example, polyoxyethylene alkyl ether, polyoxyethylene alkylallyl ether, polyoxyethylene derivatives, sorbitan fatty acid ester, polyoxyethylene sorbitan fatty acid ester, polyoxyethylene alkylamine, alkylalkanolamide and the like can be named; and as amphoteric ionic emulsifier, for example, alkylbetaine and the like can be named.

Those emulsifiers can be normally used at a concentration within a range of, based on the total solid weight of the vinyl monomers, 0.01-10 wt %, preferably 0.1-5 wt %.

Also as the radical polymerization initiator, for example, ammonium persulfate, 4,4'-azobis(4-cyanobutanoic acid) and the like can be named, which can be used in an amount ranging, based on the total solid weight of the vinyl monomers, 0.01-10 wt %, preferably 0.1-5 wt %.

Reaction temperature of the emulsion polymerization can normally range 60-90° C., and the reaction time, normally 5-10 hours.

Thus obtained water-dispersible acrylic polymer particles (C-1) generally have a hydroxyl value within a range of 1-100 mgKOH/g, preferably 3-90 mgKOH/g, inter alia, 5-80 mgKOH/g, from the viewpoint of water resistance and curability of ultimately formed coating film. For the same reason, the water-dispersible acrylic polymer particles (C-1) generally have an acid value within a range of 1-100 mgKOH/g, preferably 3-90 mgKOH/g, inter alia, 5-80 mgKOH/g. The particles (C-1) can also have an average particle size ranging from 10-1,000 nm, preferably 15-750 nm, inter alia, 20-500 nm.

The water-dispersible, acrylic polymer particles (C-1) are preferably neutralized with basic compound. As neutralizing agent for the particles (C-1), for example ammonia or water-soluble amino compounds, such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine, 2-amino-2-methylpropanol, diethanolamine, morpholine and the like can be named.

Water-Dispersible Urethane Polymer Particles (C-2)

Water-dispersible urethane polymer particles (C-2) are normally used for improving physical properties of coating film, for example, stress-alleviating effect. Where a paint composition containing them is used for automobiles, for example, they exhibit such effects as improving resistance of the coating to damages incurred by stones bumped off by running cars (chipping resistance), adherability and the like.

Water-dispersible urethane polymer particle (C-2) can be obtained, for example, by dispersing or dissolving in water a urethane polymer which is obtained upon reacting an active hydrogen-containing compound, a compound having in its molecule active hydrogen-containing group and anionic group or anion-forming group, and an organic polyisocyanate compound.

As the active hydrogen-containing compound, for example, high molecular polyol, low molecular polyol and polyamine (e.g., those disclosed in JP Hei 3 (1991)-9951A) can be named.

As high molecular polyols, polyether polyol, polyester polyol or polycarbonate polyol are preferred. The high molecular polyols can normally have an OH equivalent value within a range of 200-3,000, preferably 250-2,000. As low molecular polyols, 1,4-butanediol, 3-methylpentanediol, pentaerythritol and trimethylolpropane are preferred. Also as polyamines, hexamethylenediamine, isophoronediamine, N-hydroxyethylethylenediamine and 4,4'-diaminodicyclohexylmethane are preferred.

As the compounds having in their molecules active hydrogen-containing groups and anionic groups or anion-forming groups, for example, dihydorxycarboxylic acid (e.g., α,α-dimethylolpropionic acid, α,α'-dimethylolbutyric acid and the like), dihydroxysulfonic acid compound [e.g, 3-(2,3-dihydroxypropoxy)-1-propanesulfonic acid sodium salt and the like] and diaminocarboxylic acid (e.g., diaminobenzoic acid and the like) can be named, and as the basic compounds for neutralizing these compounds, for example, organic base (e.g., triethylamine, trimethylamine and the like) and inorganic base (e.g., sodium hydroxide, potassium hydroxide and the like) can be named.

As organic polyisocyanate compounds, for example, isophorone diisocyanate (IPDI), hexamethylene diisocyanate (HMDI) 4,4'-dicyclohexylmethane diisocyanate (hydrogeneated MDI), 2,4- or 2,6-tolylene diisocyanate (TDI), 4,4'-diphenylmethane diisocyanate (MDI), α,α,α',α'-tetramethylxylylene diisocyanate (TMXDI) and the like can be named.

The urethane polymer can be prepared by such methods as one-shot method in which all three components of an active hydrogen-containing compound, a compound having in the molecule active hydrogen-containing group and anionic group or anion-forming group and an organic polyisocyanate compound at one time; or multi-stage method in which, for example, first a part of an active hydrogen-containing compound (e.g., high molecular polyol) is reacted with a compound containing in its molecule active hydrogen-containing group and anionic group or anion-forming group and an organic polyisocyanate compound to form a prepolymer with isocyanate termini, and thereafter the prepolymer is reacted with the rest of the active hydrogen-containing compound.

The above reactions can be normally conducted at a temperature range of 40-140° C., preferably 60-120° C. The reactions can be conducted in an organic solvent inert to isocyanate, for example, acetone, toluene, dimethylformamide and the like. The organic solvent can be added either halfway the reaction or after the reaction.

The water-dispersible urethane polymer particles (C-2) can be obtained by neutralizing the urethane polymer having hydrophilic groups, which is obtained as above, with a basic compound to form anionic groups, and thereafter dispersing or dissolving the polymer in water.

In the occasion of dispersing or dissolving the urethane polymer in water, furthermore, anionic and/or nonionic surfactant may be concurrently used, where necessary.

Thermosetting, water-based paint compositions of the present invention can be prepared by, for example, adding to the aqueous amino resin dispersion (A), an aqueous varnish containing the film-forming resin (B) as dissolved or dispersed therein and/or the water-dispersible polymer particles (C), and dispersing them. In that occasion, base may be added in an amount as will render the pH of the thermosetting, water-based paint composition normally within a range of 7-9.

The blend ratio of the aqueous amino resin dispersion (A), film-forming resin (B) and/or water-dispersible polymer particles (C) in thermosetting, water-based paint composition of the present invention is not subject to strict limitations, but is broadly variable over a wide range depending on intended utility and the like of individual paint composition. Whereas, generally in terms of non-volatile components, based on the total weight of the components (A), (B) and (C), aqueous amino resin dispersion (A) may be present within a range of 1-70 wt %, preferably 2.5-60 wt %, inter alia, 5-50 wt %; and film-forming resin (B) and/or water-dispersible polymer particles (C), within a range of 30-99 wt %, preferably 40-97.5 wt %, inter alia, 50-95 wt %. Where the film-forming resin (B) and water-dispersible polymer particles (C) are used concurrently, based on the total weight of the components (A), (B) and (C), the film-forming resin (B) may be present within a range of 4-95 wt %, preferably 9-90 wt %, inter alia, 19-80 wt %; and the water-dispersible polymer particles (C), within a range of 4-95 wt %, preferably 9-90 wt %, inter alia, 19-80 wt %.

Thermosetting, water-based paint compositions of the present invention may further contain, besides the above-described components (A), (B) and (C), a crosslinking agent where necessary. The crosslinking agent is subject to no particular limitation and, for example, following blocked polyisocyanate hardening agent, water-dispersible blocked polyisocyanate hardening agent, melamine resin other than above-described hydrophobic amino resin (b) and the like can be used.

Blocked polyisocyanate hardening agent: polyisocyanate compound containing at least two free isocyanate groups per molecule, whose isocyanate groups being blocked with a blocking agent.

As the polyisocyanate compound, for example, aliphatic polyisocyanates such as hexamethylene diisocyanate, trimethylhexamethylene diisocyanate, dimeric acid diisocyanate, lysine diisocyanate and the like, biuret type adducts of these polyisocyanates, their isocyanurate ring adducts; alicyclic diisocyanates such as isophorone diisocyanate, 4,4'-methylenebis(cyclohexylisocyanate), methylcyclohexane-2,4- or 2,6-diisocyanate, 1,3- or 1,4-di(isocyanatomethyl)cyclohexane, 1,4-cyclohexane diisocyanate, 1,3-cyclopentane diisocyanate, 1,2-cyclohexane diisocyanate and the like, and biuret-type adducts and isocyanurate ring adducts of these polyisocyanates; aromatic diisocyanate compounds such as xylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenylether diisocyanate, m- or p-phenylene diisocyanate, 4,4'-biphenylene diisocyanate, 3,3'-dimethyl-4,4'-biphenylene diisocyanate, bis(4-isocyanatophenyl)sulfone, isopropylidenebis(4-phenyl isocyanate) and the like, and their biuret type adducts and isocyanurate ring adducts; polyisocyanates having at least three isocyanate groups per molecule such as triphenylmethane-4,4',4''-triisocyanate, 1,3,5-triisocyanatobenzene, 2,4,6-triisocyanatotoluene, 4,4'-dimethyldiphenylmethane-2,2',5,5'-tetraisocyanate and the like, and biuret type adducts and isocyanurate ring adducts of these polyisocyanates; and urethanated adducts formed by reacting such polyols as ethylene glycol, propylene glycol, 1,4-butylene glycol, dimethylolpropionic acid, polyalkylene glycol, trimethylolpropane, hexanetriol and the like with polyisocyanate compound at such ratios that the isocyanate groups become excessive to the hydroxyl groups of the polyol, and biuret type adducts and isocyanurate ring adducts of these polyisocyanates; and the like can be named.

Those blocking agents are used for temporarily blocking the free isocyanate groups. Whereby blocked isocyanate groups can be regenerated as free isocyanate groups when the blocking agent is dissociated under heating to at least 100° C., preferably 130° C. or higher, and can readily crosslink with hydroxyl groups and the like. As such blocking agent, for example, phenols such as phenol, cresol, xylenol, nitrophenol, ethylphenol, hydroxydiphenyl, butylphenol, isopropylphenol, nonylphenol, octylphenol, methyl hydroxybenzoate and the like; lactams such as ε-caprolactam, δ-valerolactam, γ-butyrolactam, β-propiolactam and the like; aliphatic alcohols such as methanol, ethanol, propyl alcohol, butyl alcohol, amyl alcohol, lauryl alcohol and the like; ethers such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and the like; benzyl alcohol; glycolic acid; glycolic acid esters such as methyl glycolate, ethyl glycolate, butyl glycolate and the like; lactic acid; lactic acid esters such as methyl lactate, ethyl lactate, butyl lactate and the like; alcohols such as methylolurea, methylolmelamine, diacetone alcohol, 2-hydroxyethyl acrylate, 2-hydroxyethyl methacrylate and the like; oximes such as formamidoxime, acetamidoxime, acetoxime, methyl ethyl ketoxime, diacetylmonooxime, benzophenone-oxime, cyclohexane-oxime and the like; malonic acid dialkyl esters such as dimethyl malonate, diethyl malonate, diisopropyl malonate, di-n-butyl malonate, diethyl methylmalonate, benzyl methylmalonate, diphenyl malonate and the like; acetoacetic acid esters such as methyl acetoacetate, ethyl acetoacetate, isopropyl acetoacetate, n-propyl acetoacetate, benzyl acetoacetate, phenyl acetoacetate and the like; active methylene such as acetylacetone; mercaptans such as butyl mercaptan, t-butyl mercaptan, hexyl mercaptan, t-dodecyl mercaptan, 2-mercaptobenzothiazole, thiophenol, methylthiophenol, ethylthiophenol and the like; acid amides such as acetanilide, acetoanisidide, acetotoluide, acrylamide, methacrylamide, acetic amide, stearic amide, benzamide and the like; imides such as succinimide, phthalimide, maleimide and the like; amines such as diphenylamine, phenylnaphthylamine, xylidine, N-phenylxylidine, carbazole, aniline, naphthylamine, butylamine, dibutylamine, butylphenylamine and the like; imidazoles such as imidazole, 2-ethyl-imidazole and the like; pyrazoles such as 3,5-dimethylpyrazole; ureas such as urea, thiourea, ethyleneurea, ethylenethiourea, diphenylurea and the like; carbamic acid esters such as phenyl N-phenylcarbamate; imines such as ethyleneimine, propyleneimine and the like; and sulfites such as sodium disulfite, potassium disulfite and the like can be named.

Blocked polyisocyanate hardening agent to which water-dispersibility has been imparted: For reducing solvent content of paint (low VOC content), it is desirable to reduce organic solvent content of also the crosslinking agent, and for this purpose blocked polyisocyanate hardening agent to which water dispersibility is imparted can be used within an extent not reducing coating film performance.

As the water-dispersibility-imparted blocked polyisocyanate hardening agent, for example, blocked polyisocyanate compound to which water dispersibility is imparted through the steps of blocking isocyanate groups of a polyisocyanate compound with a blocking agent containing hydroxymonocarboxylic acid and neutralizing the carboxyl groups introduced by the hydroxymonocarboxylic acid can be named. In that case, it is preferred to so carry out the reaction that at least one isocyanate group of the polyisocyanate compound adds to hydroxyl group of the hydroxymonocarboxylic acid, from the viewpoint of favorable water dispersibility of the resulting blocked polyisocyanate hardening agent.

As the polyisocyanate compound, those similar to the above-exemplified polyisocyanate compounds as for the blocked polyisocyanate hardening agent can be used. In particular, hexamethylene diisocyanate (HMDI), hexamethylene diisocyanate (HMDI) derivatives, isophorone diisocyanate (IPDI), isophorone diisocyanate (IPDI) derivatives, hydrogenated MDI and hydrogenated MDI derivatives are preferred.

As the blocking agent, those similar to the exemplified blocking agents as for preparation of the blocked polyisocyanate hardening agent can be used. As the hydroxymonocarboxylic acid, for example, 2-hydroxyacetic acid, 3-hydroxypropanoic acid, 12-hydroxy-9-octadecanoic acid (ricinoleic acid), 3-hydroxy-2,2-dimethylpropanoic acid (hydroxypivalic acid), dimethylolpropionic acid (DMPA) and the like can be named. Of these, 3-hydroxy-2,2-dimethylpropanoic acid (hydroxypivalic acid) is particularly preferred. The solvent to be used for the reaction preferably is non-reactive with isocyanate groups, which may be, for example, ketones such as acetone, methyl ethyl ketone and the like; esters such as ethyl acetate; or N-methylpyrrolidone (NMP).

Melamine resin other than the hydrophobic amino resin (b): more specifically, di-, tri-, tetra-, penta- or hexa-methylolmelamines and lower alkyl etherified products thereof (preferred alkyl being methyl, ethyl, propyl, isopropyl and the like) can be named.

As specific examples, Cymel™ series such as Cymel 303, Cymel 325, and the like by Nippon Cytec Industries Co. can be named.

Thermosetting, water-based paint compositions according to the present invention can further contain still other customary paint additives where necessary, such as pigment, hardening catalyst, UV absorber, photo stabilizer, surface-regulating agent, degradation-preventing agent, antisagging agent, sedimentation-preventing agent and the like.

As the pigment, for example, coloring pigments such as titanium dioxide, zinc flower, carbon black, cadimium red, molybdenum red, Chrome Yellow, chromiun oxide, Prussian Blue, cobalt blue, azo pigment, phthalocyanine pigment, quinacridone pigment, isoindoline pigment, threne pigment, perylene pigment and the like; extenders such as talc, clay, kaoline, baryta, barium sulfate, barium carbonate, calcium carbonate, silica alumina white and the like; effect pigments such as aluminum powder, mica powder, titanium oxide-covered mica powder and the like can be named.

Where a thermosetting, water-based paint composition of this invention is to be used as metallic finish water-based base coat paint, effect pigment and, where necessary, coloring pigment, can be added. Also when it is to be used as an intermediate paint, extender pigment such as barium sulfate, calcium carbonate, clay and the like can be used concurrently with coloring pigment. The pigment can be dispersed in a part of a resin as above-described to provide a pigment paste which is added to the remaining aqueous varnish together with other components. In the occasion of preparing the pigment paste, other customary additives such as defoaming agent, dispersing agent, surface regulating agent and the like may be concurrently and suitably used, where necessary.

Adequate blend ratio of pigment is generally within a range of 1-250 wt parts, in particular, 3-150 wt parts, per 100 wt parts of total solid components of aqueous amino resin dispersion (A), film-forming resin (B) and water-dispersible polymer particles (C) in the thermosetting, water-based paint composition.

As hardening catalyst, for example, organometal compound, acid compound and base compound can be used.

As the organometal compounds, for example, metallic catalysts such as tetraisopropyl titanate, tetrabutyl titanate, lithium acetate, iron (III) acetylacetonate, zinc 2-ethylhexanoate, copper acetate, vanadium trichloride, tin octylate, dibutyltin diacetate, dibutyltin dioctoate, dibutyltin dilaurate, dibutyltin dimaleate, tetrabutyltin, dibutyltin oxide, tetra-n-butyl-1,3-diacetyloxydistanoxane, tetra-n-propyl-1,3-diacetyloxydistanoxane, tetra-n-butyl-1,3-dilauryloxydistanoxane and the like can be named. In particular, organotin compounds such as tin octylate, dibutyltin diacetate, dibutyltin dilaurate, distanoxanes and the like are preferred. Furthermore, where low temperature baking is required, dibutyltin diacetate can be favorably used.

As the acid compound, for example paratoluenesulfonic acid, dodecylbenzenesulfonic acid, dinonylnaphthalenesulfonic acid, dinonylnaphthalenedisulfonic acid, butylphosphoric acid, octylphosphoric acid and the like can be named. Amine-neutralized products of these acids can also be conveniently used.

As the base compound, for example, trimethylamine triethylamine, dimethylcyclohexylamine, N-tetramethylhexane-1,6-diamine, N-pentamethyldiethylenetriamine, 2-methyl-1,4-diazabicyclo[2,2,2]octane and the like can be used.

These compounds which are named above as the hardening catalyst can be used either singly or in combination of two or more. Use rate of hardening catalyst varies depending on the kind of the catalyst, while normally suitable range is about 0.05-5 wt parts, per 100 wt parts of the total solid components of aqueous amino resin dispersion (A), film-forming resin (B) and water-dispersible polymer particles (C).

As UV absorber, those known per se, for example, benzotriazole absorbers, triazine absorbers, salycilic acid derivative absorbers, benzophenone absorbers and the like can be used. Where a UV absorber is to be contained, its content in the paint composition can normally range 0.1-10 wt parts, in particular, 0.2-5 wt parts, inter alia, 0.3-2 wt parts, per 100 wt parts of the total weight of solid components of aqueous amino resin dispersion (A), film-forming resin (B) and water-dispersible polymer particles (C), from the viewpoints of weatherability and yellowing resistance.

As the photo-stabilizer, those known per se, for example, hindered amine photo-stabilizers, can be used. Where a photo-stabilizer is used, its content in the paint composition may range 0.1-10 wt parts, in particular, 0.2-5 wt parts, inter alia, 0.3-2 wt parts, per 100 wt parts of the total solid components of aqueous amino resin dispersion (A), film-forming resin (B) and water-dispersible polymer particles (C), for favorable weatherability and yellowing resistance.

The thermosetting, water-based paint compositions according to the invention may further contain, where necessary, a minor amount of a resin having no crosslinking functional group, such as acrylic resin, polyester resin and the like which are customarily used as main resins in water-based paint.

Multi-Layered Coating Film-Forming Method:

The thermosetting, water-based paint compositions according to the present invention can give coating film of excellent performance such as finished appearance, water resistance and the like, when applied on object articles. While the articles to which the paint compositions are applicable are not subject to any particular limitation, for example, bodies of various vehicles such as automobiles, two-wheelers, container cars and the like are preferred. The articles may also be steel sheet such as cold-rolled steel sheet, zinc-plated steel sheet, zinc alloy-plated steel sheet, stainless steel sheet, tin-plated steel sheet and the like; metallic substrates such as aluminum sheet, aluminum alloy sheet and the like; and various plastic sheets, which constitute these car bodies.

The articles to be coated may be these car bodies or metallic substrates with their metallic surfaces having been given a surface treatment such as phosphate treatment, chromate treatment, compound oxide treatment or the like. Furthermore, such surface-treated car bodies and metallic substrates may have been applied with undercoat and/or intermediate coat of various electrodeposition paint and the like.

Methods for applying the thermosetting water-based paint compositions of the present invention are not subject to any particular limitation, and any of air spray coating, airless spray coating, rotary atomizing coating, curtain coating methods and the like can be used to form wet coating film. These coating methods may be conducted under electrostatic application, where necessary. Of these, air spray coating method is particularly convenient. Normally preferred application rate of the thermosetting, water-based paint ranges from about 10 to about 70 µm, in particular, from about 15 to about 60 µm, in terms of the hardened film thickness.

In the occasions of air spray coating, airless spray coating or rotary atomizing coating, preferably the viscosity of the paint composition is adjusted in advance with organic solvent and/or water, to fall within a viscosity range suitable for the coating, normally about 15-60 seconds at 20° C. as measured with Ford Cup #4 viscosimeter.

Hardening of wet coating film is effected by heating after the thermosetting, water-based paint composition is applied onto an object article. The heating can be conducted by a heating means known per se, such as drying oven, e.g., hot air-current oven, electric oven, infrared induction heating oven and the like. Suitable heating temperature is normally within a range of 80-180° C., in particular, 100-160° C. The heating time is not particularly limited, but normally it can be within a range of about 20-40 minutes.

The thermosetting, water-based paint compositions of the present invention can be conveniently used as paint for cars, in particular, as intermediate paint and base coat paint for top coating.

In their use as intermediate paint, for example, a thermosetting, water-based paint composition of the preset invention is applied onto an electrodeposition-coated object article, the coating film is hardened by heating and thereafter a top coat is applied onto the hardened coating film and hardened, to provide a multi-layered coating film.

When they are used as base coat paint for top coating, for example, a thermosetting, water-based paint composition of the present invention is applied onto an object article which has been applied with electrodeposition coat and/or intermediate coat, and onto the unhardened base coat film a clear paint is applied without an intervening hardening of the film. Upon subsequent simultaneous hardening of the base coat and clear coat by heating, a multi-layered coating film can be formed by the 2-coat-1-bake system.

A thermosetting, water-based paint composition according to the present invention may also be used for an intermediate coat and/or base coat in multi-layered coating film-forming method by 3-coat-1-bake system comprising applying an intermediate paint on an object article, applying onto the unhardened intermediate coating film a base coat paint without an intervening hardening, further applying onto the unhardened base coat film a clear paint without an intervening hardening, and thereafter heating the three-layered coating film to simultaneously harden the same.

As the clear coating paint useful in the above, thermosetting clear paints known per se can be used. More specifically, organic solvent-diluted paint compositions in which main resins such as alkyd resin, polyester resin, acrylic resin, silicone resin, fluorinated resin, urethane resin and the like are combined with hardening agents such as amino resin, polyisocyanate compound, blocked polyisocyanate compound, polycarboxylic acid or anhydride thereof, reactive silane compound and the like which are reactive with the reactive functional groups contained in the main resins. As the polyisocyanate compound and blocked polyisocyanate compound, for example, those earlier-named in respect of those other crosslinking agents can be used. High solid type paint, water-based paint or powder using less amount of organic solvent can also be used as the clear coating paint, for avoiding environmental pollution and for resource saving.

In particular, clear coating paint of acrylic resin/melamine resin, acrylic resin/polyisocyanate hardening agent, or acrylic resin/blocked polyisocyanate hardening agent or acid group-containing resin/epoxy group-containing resin can be advantageous used.

EXAMPLES

Hereinafter the invention is explained more specifically, referring to Working Examples and Comparative Examples, it being understood that the invention is in no way restricted to these Working Examples only. In the following, parts and percentages are by weight, and the coating film thickness is that of hardened coating film.

Production of Polyester Resin (a)

Production Example 1

A reactor equipped with a stirrer, reflux condenser, water separator and thermometer was charged with hexahydrophthalic anhydride (207.3 parts), adipic acid (234 parts), Cardura™ E10P (Japan Epoxy Resin Co., Ltd., monoglycidyl neodecanoate (461.5 parts), dimethylolpropionic acid (85.9 parts) and trimethylolpropane (87.5 parts), which were reacted at 100-230° C. for 7 hours. Then trimellitic anhydride (17.24 parts) was further added and the system was subjected to condensation reaction at 180° C. Thereafter the solid concentration by weight of the reaction product was adjusted to 70% by addition of dipropylene glycol methyl ether, to provide polyester resin 1 having an acid value of 50 mgKOH/g, hydroxyl value of 64 mgKOH/g and number-average molecular weight of 1,500.

Production Examples 2-5

Using the starting materials as identified in the following Table 1 in the amounts as indicated in the same Table, those procedures of Production Example 1 were repeated to provide polyester resins 2-5, respectively. The hydroxyl values, acid values and number-average molecular weights of the polyester resins 2-5 are also given in the same Table 1.

Production of Aqueous Amino Resin Dispersion

Example 1

The polyester resin 1 as prepared in Production Example 1 (357.1 parts; solid content, 250 parts) and U-Van™ 20SE-60 (Mitsui Chemicals, butylated melamine resin, solid content, 60%; titer of water indicating hydrophobicity of the amino resin, 2.1 (ml)) (1250 parts; solid content, 750 parts) were stirred at 80° C. for an hour. Cooling the mixture to 40° C., dimethylethanolamine (17.85 parts) was added and thoroughly stirred. Thereafter deionized water (2375 parts) was gradually added under stirring, to provide aqueous amino resin dispersion 1 (solid content, 25%) in which the average particle size was 230 nm (as measured of the deionized water-diluted product at 20° C., with a submicron particle size distribution measuring device, "COULTER™ N4 Model" (Beckman Coulter Co.).

Examples 2-6 and Comparative Example 1

Using the starting materials as identified in the following Table 2 in the amounts as indicated in the same Table, the procedures of above Example 1 were repeated to provide aqueous amino resin dispersions 2-7, respectively. Average particle size of the resulting aqueous amino resin dispersions 2-7 are also shown in Table 2.

The result of visual evaluation of dispersibility of the aqueous amino resin dispersions 1-7 is also concurrently shown in Table 2. The criteria of the evaluation were as follows.

(Dispersibility)

◯: no sedimentation was observed after 24 hours' standing at room temperature

X: sedimentation was observed after 24 hours' standing at room temperature

In the following Table 2, (*1) and (*2) were respectively the following:

(*1) U-Van™ 28-60: Mitsui Chemicals, butylated melamine resin, solid content=60%, the titer of water indicating hydrophobicity of the amino resin=3.6 (mL)

(*2) Cymel™ 250: Nippon Cytec Industries, Co., methyl-butyl mixed etherified melamine resin, solid content=70%, the titer of water indicating hydrophobicity of the amino resin=1.8 (mL)

TABLE 1

|  |  | Production Example | | | | |
|---|---|---|---|---|---|---|
|  | Polyester Resin | 1 | 2 | 3 | 4 | 5 |
| Starting | hexahydrophthalic anhydride | 207.3 | 428.6 | 225.9 | 209.4 | 257.2 |
| Materials | adipic acid | 234 |  | 267.7 | 220.6 | 312.6 |
|  | Cardura E10P | 461.5 | 471.93 | 264.1 | 435.2 |  |
|  | dimethylolpropionic acid | 85.9 | 81.1 | 98.3 |  | 114.8 |
|  | trimethylolpropane | 87.5 | 62 | 100.1 | 82.5 | 116.9 |
|  | 1,6-hexanediol |  |  | 129.8 | 71.3 | 303.1 |
|  | trimellitic anhydride | 17.24 | 17.24 | 19.7 | 59.78 | 18.07 |
| Parameters | Hydroxyl value (mgKOH/g) | 64 | 54 | 75 | 48.4 | 88 |
|  | Acid value (mgKOH/g) | 50 | 50 | 51 | 50 | 50 |
|  | number-average molecular weight | 3000 | 2900 | 2900 | 2400 | 3100 |

TABLE 2

|  | Example | | | | | | Comparative Example |
|---|---|---|---|---|---|---|---|
|  | 1 | 2 | 3 | 4 | 5 | 6 | 1 |
| Aqueous amino resin dispersion | 1 | 2 | 3 | 4 | 5 | 6 | 7 |
| Polyester resin 1 | 357.1 | 357.1 | 357.1 |  |  |  |  |
| Polyester resin 2 |  |  |  | 357.1 |  |  |  |
| Polyester resin 3 |  |  |  |  | 357.1 |  |  |
| Polyester resin 4 |  |  |  |  |  | 357.1 |  |
| Polyester resin 5 |  |  |  |  |  |  | 357.1 |
| U-Van 20SE-60 | 1250 |  |  | 1250 | 1250 | 1250 | 1250 |
| U-Van 28-60 (*1) |  | 1250 |  |  |  |  |  |
| Cymel 250 (*2) |  |  | 1071 |  |  |  |  |
| Dimethyl-ethanolamine | 17.85 | 17.85 | 17.85 | 17.85 | 17.85 | 17.85 | 17.85 |
| Deionized water | 2375 | 2375 | 2554 | 2375 | 2375 | 2375 | 2375 |
| Total | 4000 | 4000 | 4000 | 4000 | 4000 | 4000 | 4000 |
| Average particle size (nm) | 230 | 220 | 250 | 220 | 220 | 230 | — |
| Dispersibility | ◯ | ◯ | ◯ | ◯ | ◯ | ◯ | X |

Production of Thermosetting, Water-Based Paint Composition (Water-Based Intermediate Paint)

Example 7

To polyester resin A (*3) (56.7 parts), aqueous amino resin dispersion 1 as obtained in above Example 1 (53.3 parts), BYHIDULE™ VP LS2310 (Sumika Bayer Urethane Co., water-dispersibility-imparted blocked aliphatic polyisocyanate hardening agent, solid content, 40%) (75 parts), JR-806™ (Tayca Corporation, rutile-type titanium dioxide) (70 parts), Carbon MA-100™ (Mitsubishi Chemicals, carbon black) (1 part), Barium Sulfate B35™ (Sakai Chemicals, barium sulfate) (30 parts) and MICRO ACE S-3™ (Nihon Talc, finely pulverized talc) (10 parts) were added under stirring, dispersed and mixed. Further dimethylethanolamine and deionized water were added to adjust the pH to 8.5 and the viscosity, to 40 seconds/Ford Cup #4/20° C. Thus a water-based intermediate paint 1 was obtained.

(*3) Polyester resin A:
A reactor equipped with a stirrer, reflux condenser, water-separator and thermometer was charged with 1,6-hexanediol (236 parts), hexahydrophthalic anhydride (308 parts) and Cardura™ E10P (490 parts), which were reacted at 100-230° C. for 3 hours. (The sample taken at this timepoint had a hydroxyl value of 217 mgKOH/g and number-average molecular weight of 620.) Thereafter trimellitic anhydride (230 parts) was added to conduct a condensation reaction at 180° C. Thus polyester resin A having an acid value of 50 mgKOH/g, hydroxyl value of 69 mgKOH/g and number-average molecular weight of 1900 was obtained.

Examples 8-14 and Comparative Examples 2-3

Using the starting materials as identified in the following Table 3 in the amounts as indicated in the same Table, the procedures of Example 7 were repeated to provide water-based intermediate paints 2-10. The blend ratios shown in Table 3 are by weight of solid contents of the respective components.

In the following Table 3, (*4) and (*5) were respectively the following:

(*4) Cymel™ 325: Nippon Cytec Industries, Co., imino group-type methylated melamine resin, solid content=80%, the titer of water indicating hydrophobicity of the amino resin=12.0 (mL)

(*5) SUPERFLEX™ 410: Dai-ichi Kogyo Seiyaku, Co., an aqueous polycarbonate urethane resin (water-dispersible urethane polymer particles), solid content=40%

Coating Film-Forming Method

Preparation 1 of Test Panels

Those water-based intermediate paints 1-10 as obtained in above Examples 7-14 and Comparative Examples 2-3 were used to provide respective test panels in the following manner, to be tested of their coating film performance.

(Substrate to be Coated)

Cold-rolled steel sheet applied with PALBOND™#3020 (Nippon Parkerizing, Co., a zinc phosphating agent) was electrodeposition coated with ELECRON™ GT-10 (Kansai Paint, a cationic electrodeposition paint) to a film thickness of 20 μm, which was baked at 170° C. for 30 minutes to form the electrocoated film. This sheet was used as the substrate.

(Coating Method)

On the above substrate, those water-based intermediate paints as prepared in above Examples and Comparative Examples were applied each to a film thickness of 35 μm. After subsequent 2 minutes' standing, the film was preheated at 80° C. for 5 minutes, and then hardened by heating at 140° C. for 20 minutes. Then on the water-based intermediate coat, MAGICRON™ TB-515 (Kansai Paint, an acrylic-melamine resin-solvent type top-coating base paint) was applied to a film thickness of 15 μm, left standing for 3 minutes at room temperature, onto the unhardened coated surface MAGICRON™ TC-71 (Kansai Paint, acrylic-melamine resin-solvent type top coating clear paint) was applied to a film thickness of 35 μm, and the two coating films were hardened simultaneously by heating at 140° C. for 30 minutes.

Performance Test Result 1

Performance test results of the test panels as prepared in above and the paints are concurrently shown in the following Table 3. The test methods and evaluation methods were as follows.

Appearance of coating film:
Appearance of the test panels was visually evaluated:
◯: all of smoothness, gloss and image sharpness were good;

Δ: at least one of smoothness, gloss and image sharpness was inferior;

X: at least one of smoothness, gloss and image sharpness was markedly inferior.

Water Resistance:

The test panels were immersed in 40° C. deionized water for 240 hours, and their appearance and adherability of their coating films were examined. As to the adherability, the coating films were given x-formed cross cuts with a cutter knife reaching to the substrate, adhesive cellophane tape was stuck on the cross cut portions and then rapidly peeled off. The extent of accompanying peeling in the coating films was evaluated:

○: no abnormality observed;

Δ: no external abnormality such as occurrence of popping or blistering was observed but peeling was perceived;

X: both external abnormalities such as occurrence of popping or blistering and peeling were observed.

Storage Stability:

Condition of those water-based intermediate paints after storage at 40° C. for 10 days was examined:

○: favorable and no problem;

Δ: viscosity rise in paint was observed;

X: viscosity of paint rose markedly.

water were added to adjust the pH to 8.0 and the viscosity, to 40 seconds/Ford Cup #4/20° C., to provide a water-based base coat paint 1.

(*6) Water-dispersible acrylic polymer particles:

A reactor equipped with a thermometer, thermostat, stirrer, reflux condenser and a dropping device was charged with deionized water (145 parts) and Newcol™ 562SF (Nippon Emulsifier Co., ammonium polyoxyethylene-alkylbenzenesulfonate, active ingredient=60%) (1.2 parts). The content was stirred and mixed in nitrogen current and the temperature was raised to 80° C. Then 1% of the total amount of the following monomeric emulsion and 3% aqueous ammonium persulfate solution (5.2 parts) were introduced into the reactor and allowed to stand at 80° C. for 15 minutes. Thereafter the remaining monomeric emulsion 1 was dropped into the reactor over 3 hours, followed by an hour's aging after completion of the dropwise addition. Then the following monomeric emulsion 2 and 3% aqueous ammonium persulfate solution were dropped into the reactor over 2 hours. After the subsequent an hour's aging, 1.5% aqueous dimethylethanolamine solution (89 parts) was gradually added to the reactor, while lowering the temperature to 30° C. Discharging the content as filtering it through 100 mesh Nylon cloth, water-dispersible acrylic polymer particles (solid content=25.2%) having an average particle size of 100 nm, acid value 30.7 mgKOH/g and hydroxyl value 22.1 mgKOH/g were obtained.

TABLE 3

| | Example | | | | | | | | Comparative Example | |
|---|---|---|---|---|---|---|---|---|---|---|
| | 7 | 8 | 9 | 10 | 11 | 12 | 13 | 14 | 2 | 3 |
| water-based intermediate paint | 1 | 2 | 3 | 4 | 5 | 6 | 7 | 8 | 9 | 10 |
| Polyester resin A | 56.7 | 56.7 | 56.7 | 56.7 | 56.7 | 56.7 | 46.7 | 65 | 60 | 60 |
| BYHIDULE VP LS2310 | 30 | 30 | 30 | 30 | 30 | 30 | 20 | | 30 | 30 |
| Aqueous amino resin dispersion 1 | 13.3 | | | | | | 13.3 | 35 | | |
| Aqueous amino resin dispersion 2 | | 13.3 | | | | | | | | |
| Aqueous amino resin dispersion 3 | | | 13.3 | | | | | | | |
| Aqueous amino resin dispersion 4 | | | | 13.3 | | | | | | |
| Aqueous amino resin dispersion 5 | | | | | 13.3 | | | | | |
| Aqueous amino resin dispersion 6 | | | | | | 13.3 | | | | |
| Cymel 325 (*4) | | | | | | | | | 10 | |
| U-Van 20SE-60 (cf. Example 1) | | | | | | | | | | 10 |
| Superflex 410 (*5) | | | | | | | 20 | | | |
| JR806 | | | | | 70 | | | | | |
| Carbon MA-100 | | | | | 1 | | | | | |
| Barium Sulfate B35 | | | | | 30 | | | | | |
| MICRO ACE S-3 | | | | | 10 | | | | | |
| Appearance of coating film | ○ | ○ | ○ | ○ | ○ | ○ | ○ | ○ | ○ | Δ |
| Water resistance | ○ | ○ | ○ | ○ | ○ | ○ | ○ | ○ | Δ | Δ |
| Storage stability | ○ | ○ | ○ | ○ | ○ | ○ | ○ | ○ | ○ | Δ |

Production Examples of Thermosetting, Water-Based Paint Composition (Water-Based Base Coating Paint)

Example 15

To 23.3 parts of polyester resin A, Cymel 325 (12.5 parts), aqueous amino resin dispersion 1 as obtained in Example 1 (106.7 parts), BYHIDULE VP LS2310 (25 parts) and water-dispersible acrylic polymer particles (*6; solid content=25.2%) (119 parts) were added under stirring. Thereafter ALUMI PASTE GX™ 180A (Asahi Chemical Industry Co., aluminum flake paste) of an amount providing 20 parts as the aluminum pigment was added under stirring, mixed and dispersed. Further dimethylethanolamine and deionized Monomeric Emulsion 1:

Mixing and stirring deionized water (94.3 parts), methyl methacrylate (17 parts), N-butyl acrylate (80 parts), allyl methacrylate (3 parts) and Newcol 562SF (1.2 parts), monomeric emulsion 1 was obtained.

Monomeric Emulsion 2:

Mixing and stirring deionized water (39 parts), methyl methacrylate (15.4 parts), n-butyl acrylate (2.9 parts), hydroxylethyl acrylate (5.9 parts), methacrylic acid (5.1 parts) and Newcol 562SF (0.5 part), monomeric emulsion 2 was obtained.

Examples 16-22 and Comparative Examples 4-6

Using the starting materials as identified in the following Table 4, of the amounts as indicated in the same Table, the procedures of Example 15 were repeated to provide water-based base coat paints 2-11. The blend ratios shown in Table 4 are weight ratios of solid contents of the respective components.

Coating Film-Forming Method
Preparation 2 of Test Panels

Water-based base coat paints 1-11 as prepared in above Example 15-22 and Comparative Examples 4-6 were used to provide respective test panels in the following manner, to be tested of their coating film performance.

(Substrate to be Coated)

Dull steel plate of 0.8 mm in thickness which had been given a zinc phosphating treatment was electrodeposition coated with ELECRON™ 9600 (Kansai Paint, thermosetting epoxy resin cationic electrodeposition paint) to a film thickness of 20 μm, which was hardened by 30 minutes' heating at 170° C. Onto the hardened film AMILAC™ TP-65-2 (Kansai Paint, polyester-melamine resin-type intermediate paint for automobiles) was air spray coated to a film thickness of 35 μm, followed by hardening by heating at 140° C. for 30 minutes to provide a substrate to be coated.

(Coating Method)

On the above substrate, those water-based base coat paints as prepared in the above Examples or Comparative Examples were applied with a rotary atomizer at the booth temperature/humidity of 25° C./75%, to a film thickness of 15 μm, allowed to stand for 2 minutes and pre-heated at 80° C. for 3 minutes. Then onto the unhardened base coat surface, MAGICRON™ TC-71 (Kansai Paint, acryl-melamine resin-solvent type top coating clear paint) with its viscosity adjusted to 30 seconds/Ford Cup #4/20° C. by addition of SWASOL™ 1000 (Cosmo Petroleum Co., petroleum-derived aromatic hydrocarbon solvent) was applied with minibell rotary atomizer under the booth temperature/humidity of 25° C./75%, to a film thickness of 40 μm. After 7 minutes' standing, these two coating films were simultaneously hardened by heating at 140° C. for 30 minutes, to provide the test panels.

Performance Test Result 2

Performance test result of the test panels as prepared in the above and the paints are concurrently shown in the following Table 4. The test methods and the evaluation methods were as follows.

Appearance, water resistance and storage stability of the coating film were tested and evaluated similarly to the above performance test result 1.

IV Value:

Measured with laser-type metallic-texture measuring apparatus (ALCOPE™ LMR-200: Kansai Paint). IV is an index of whiteness of metallic coat. Degree of whiteness increases the more the metallic pigment used is uniformly oriented in parallel with the coated surface, giving favorable metallic appearance. Higher IV value shows higher degree of whiteness.

Metallic Unevenness:

Metallic unevenness on the test panels was visually evaluated:

○: no metallic unevenness was observed;
Δ: a little metallic unevenness was observed;
X: metallic unevenness was conspicuous.

Solid Content of Paint:

About 2 g each of the water-based base coat paints was taken onto an aluminum foil cup of about 5 cm in diameter and solid weight concentration (%) was measured (solid component-measuring condition: measured after 1 hour's drying at 110° C.).

TABLE 4

| | Example | | | | | | | | Comparative Example | | |
|---|---|---|---|---|---|---|---|---|---|---|---|
| | 15 | 16 | 17 | 18 | 19 | 20 | 21 | 22 | 4 | 5 | 6 |
| water-based intermediate paint | 1 | 2 | 3 | 4 | 5 | 6 | 7 | 8 | 9 | 10 | 11 |
| Polyester resin A | 23.3 | 23.3 | 23.3 | 23.3 | 23.3 | 23.3 | 20 | 20 | 30 | 30 | 30 |
| BYHIDULE VP LS2310 | 10 | 10 | 10 | 10 | 10 | 10 | 10 | | | | 10 |
| Aqueous amino resin dispersion 1 | 26.7 | | | | | | 40 | 50 | | | |
| Aqueous amino resin dispersion 2 | | 26.7 | | | | | | | | | |
| Aqueous amino resin dispersion 3 | | | 26.7 | | | | | | | | |
| Aqueous amino resin dispersion 4 | | | | 26.7 | | | | | | | |
| Aqueous amino resin dispersion 5 | | | | | 26.7 | | | | | | |
| Aqueous amino resin dispersion 6 | | | | | | 26.7 | | | | | |
| Cymel 325 (*4) | 10 | 10 | 10 | 10 | 10 | 10 | | | 30 | 10 | 10 |
| U-Van 20SE-60 (cf. Example 1) | | | | | | | | | | 20 | 20 |
| Water-dispersible acrylic polymer particles (*6) | 30 | 30 | 30 | 30 | 30 | 30 | 30 | 30 | 40 | 40 | 30 |
| ALUMI PASTE GX 180A | | | | | | 20 | | | | | |
| Appearance of coating film | ○ | ○ | ○ | ○ | ○ | ○ | ○ | ○ | ○ | Δ | Δ |
| Water resistance | ○ | ○ | ○ | ○ | ○ | ○ | ○ | ○ | Δ | Δ | Δ |
| Storage stability | ○ | ○ | ○ | ○ | ○ | ○ | ○ | ○ | ○ | Δ | Δ |
| IV value | 277 | 278 | 281 | 282 | 278 | 281 | 279 | 279 | 279 | 198 | 203 |
| Metallic unevenness | ○ | ○ | ○ | ○ | ○ | ○ | ○ | ○ | ○ | Δ | Δ |
| Solid content of pant (wt %) | 26 | 25 | 22 | 22 | 23 | 23 | 22 | 22 | 24 | 21 | 21 |

Coating Film-Forming Method
Preparation 3 of Test Panels

Two kinds of test panels were prepared using the water-based intermediate paints 1 and 9 and water-based base coat paints 1 and 9, as described in the following Example 23 and Comparative Example 7.

(Substrate Coated)

Onto a 0.8 mm-thick dull steel plate which had been given zinc phosphating treatment, ELECRON™ 9600 (Kansai Paint, a thermosetting epoxy resin cationic electrodeposition paint) was electrocoated to a film thickness of 20 μm, followed by heating at 170° C. for 30 minutes to form an elctrodeposited coat. This plate was used as the substrate to be coated.

Example 23

On the substrate, the water-based intermediate paint 1 as prepared in Example 7 was applied to a film thickness of 35 µm. After 2 minutes' standing, the coated surface was preheated at 80° C. for 5 minutes and onto the unhardened water-based intermediate coating film, the water-based base coat paint 1 as prepared in Example 15 was applied with a rotary atomizer at the booth temperature/humidity of 25° C./75%, to a film thickness of 15 µm. After subsequent standing for 2 minutes, the film was preheated at 80° C. for 3 minutes.

Then onto the unhardened water-based base coat, MAGICRON™ TC-71 (Kansai Paint, an acrylic resin-melamine resin-solvent type top clear paint) whose viscosity had been adjusted by adding SWASOL™ 1000 to 30 seconds/Ford Cup #4/20° C. was applied with a minibell rotary atomizer at the booth temperature/humidity of 25° C./75% to a film thickness of 40 µm. After 7 minutes' standing, the three-layered coating film was simultaneously hardened by heating at 140° C. for 30 minutes to provide a test panel.

Comparative Example 7

Example 23 was repeated except that the water-based intermediate paint 1 was replaced with water-based intermediate paint 9 as prepared in Comparative Example 2; and water-based base coat paint 1, with water-based base coat paint 9 as prepared in Comparative Example 4, to provide a test panel.
Performance Test Result 3

Results of the performance tests of so prepared test panels were as shown in Table 5. The test methods and evaluation methods were similar to those as described in respect of the Performance test result 2.

TABLE 5

|  | Example 23 | Comparative Example 7 |
|---|---|---|
| Water-based intermediate paint | 1 | 9 |
| Water-based top-coating base coat paint | 1 | 9 |
| Appearance of coating film | ○ | ○ |
| Water resistance | ○ | Δ |
| IV value | 272 | 268 |
| Metallic unevenness | ○ | ○ |

The invention claimed is:

1. An aqueous amino resin dispersion (A) comprising:
a polyester resin (a) having a hydroxyl value within a range of 30-100 mgKOH/g, an acid value within a range of 20-80 mgKOH/g and a number-average molecular weight of 2,000-5,000, and
a hydrophobic amino resin (b),
wherein the polyester resin (a) and the amino resin (b) comprise solid components,
wherein the weight ratio between the solid components of the polyester resin (a)/amino resin (b) is within a range of 5/95-49/51, and
wherein the polyester resin (a) is prepared by a process consisting of an esterification reaction of a polyhydric alcohol (a-1) comprising at least as a part thereof, a compound having at least two hydroxyl groups per molecule and an anionic group-forming functional group, a polycarboxylic acid and/or polycarboxylic anhydride (a-2), and a monoepoxide compound (a-3) having one epoxy group and one chain or cyclic hydrocarbon group having 6-20 carbon atoms per molecule, and optionally followed by urethanation of the polyester resin (a).

2. The aqueous amino resin dispersion as set forth in claim 1, wherein the polyhydric alcohol (a-1) comprises, as at least a part thereof, dimethylolpropionic acid or dimethylolbutanoic acid.

3. The aqueous amino resin dispersion as set forth in claim 1, wherein the polycarboxylic acid and/or polycarboxylic anhydride (a-2) is divalent or trivalent carboxylic anhydride.

4. The aqueous amino resin dispersion as set forth in claim 1, wherein the monoepoxide compound (a-3) is a glycidyl ester having a $C_6$-$C_{12}$ chain or cyclic hydrocarbon group.

5. The aqueous amino resin dispersion as set forth in claim 1, wherein the monoepoxide compound (a-3) is reacted at a ratio within a range of 10-90 parts by weight per 100 parts by weight of the sum of the polyhydric alcohol (a-1), the polycarboxylic acid and/or polycarboxylic anhydride (a-2) and the monoepoxide compound (a-3).

6. The aqueous amino resin dispersion as set forth in claim 1, wherein the hydrophobic amino resin (b) is an amino resin whose titer of water is not more than 9 mL.

7. The aqueous amino resin dispersion as set forth in claim 1, wherein the hydrophobic amino resin (b) is a condensation product of an amino compound with formaldehyde, or the condensation product which is further etherified with alcohol.

8. The aqueous amino resin dispersion as set forth in claim 7, wherein the amino compound is melamine.

9. The aqueous amino resin dispersion as set forth in claim 7, wherein the hydrophobic amino resin (b) is an amino resin comprising butyl ether groups which are etherified with n-butyl alcohol.

10. The aqueous amino resin dispersion as set forth in claim 1, wherein the weight ratio of the solid components of the polyester resin (a)/amino resin (b) is within a range of 10/90-40/60.

11. A thermosetting, water-based paint composition which comprises the aqueous amino resin dispersion (A) as set forth in claim 1.

12. The thermosetting, water-based paint composition as set forth in claim 11, further comprising a film-forming resin (B) having an acid value within a range of 5-200 mgKOH/g, a hydroxyl value within a range of 5-200 mgKOH/g and a number-average molecular weight within a range of 500-100,000.

13. The thermosetting, water-based paint composition as set forth in claim 12, wherein the film-forming resin (B) is an acrylic resin or a polyester resin.

14. The thermosetting, water-based paint composition as set forth in claim 11, further comprising water-dispersible polymer particles (C).

15. The thermosetting, water-based paint composition as set forth in claim 14, wherein the water-dispersible polymer particles (C) are water-dispersible acrylic polymer particles or water-dispersible urethane polymer particles.

16. The thermosetting, water-based paint composition as set forth in claim 14, comprising, as the non-volatile components, 1-70% of component (A) and 30-99% of combined components (B) and (C), based on the total weight of the components (A), (B) and (C).

17. A method for forming a multi-layered coating film comprising applying a thermosetting, water-based paint composition as set forth in claim 11, as an intermediate paint, onto an object to be coated to obtain a coating film (1) on a surface of the object to be coated, hardening the coating film (1) by heating, further applying onto an intermediate paint-coated surface, a top coat paint to obtain a coating film (2), and hardening the coating film (2) by heating.

18. A method for forming a multi-layered coating film comprising, applying a thermosetting, water-based paint composition as set forth in claim 11, as an unhardened base coat paint, onto an object to be coated, further applying onto an unhardened base coat paint-coated surface, a clear coat paint, and simultaneously hardening the base coat and clear coat by heating.

19. A method for forming a multi-layered coating film by 3-coat-1-bake system, comprising, applying an unhardened intermediate paint onto an object to be coated, applying onto an unhardened intermediate paint-coated surface, an unhardened base coat paint, further applying onto an unhardened base coat paint-coated surface, a clear coat paint and simultaneously hardening the intermediate coat, base coat and clear coat by heating, wherein the thermosetting, water-based paint composition as set forth in claim 11 is the intermediate paint and/or base coat paint.

20. Articles which are coated by the method according to any one of claims 17-19.

* * * * *